Sept. 22, 1936.  J. W. HICE  2,054,858
CAR LOADING DEVICE
Filed Nov. 11, 1931
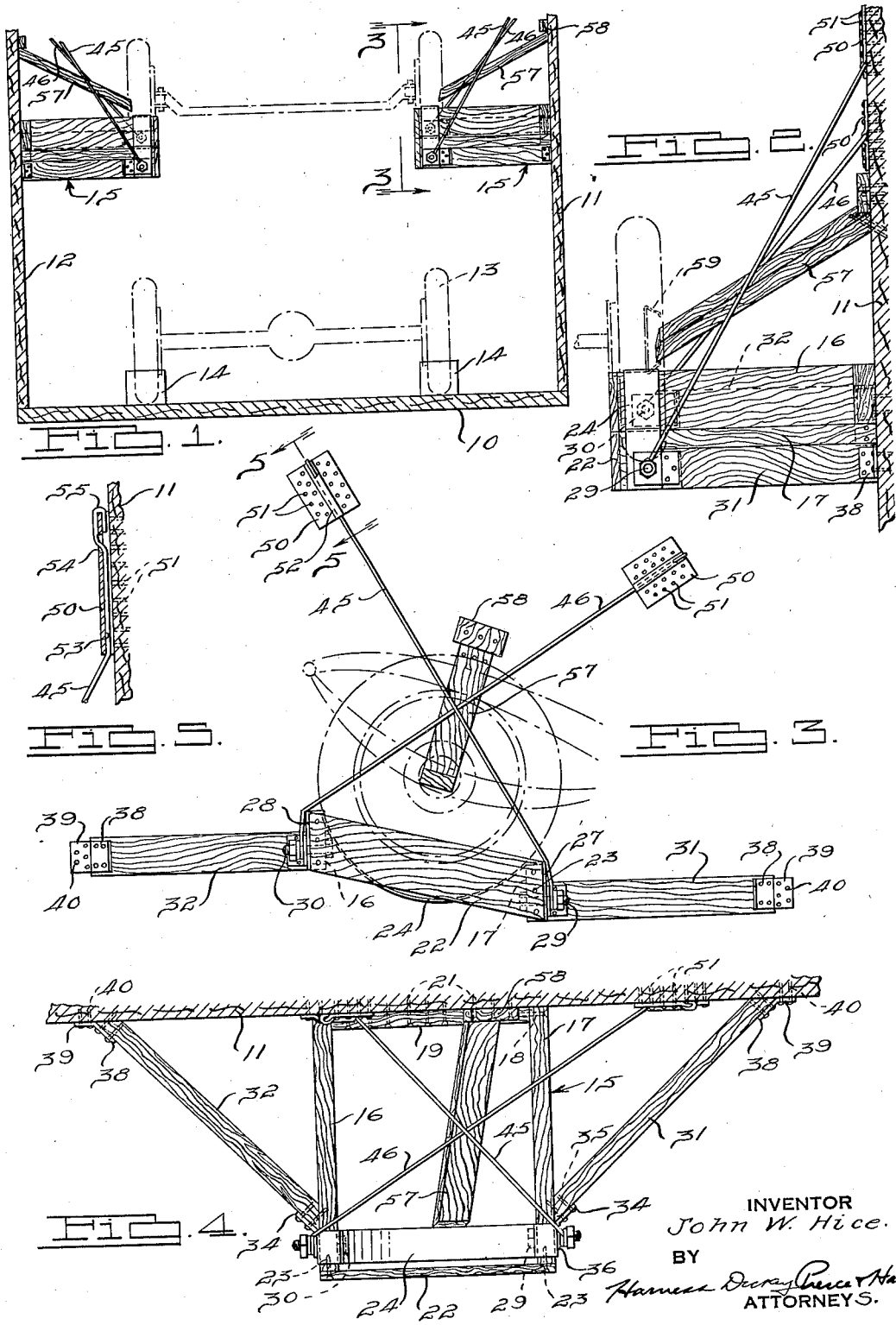
INVENTOR
John W. Hice.
BY
ATTORNEYS Patented Sept. 22, 1936

2,054,858

UNITED STATES PATENT OFFICE 2,054,858

CAR LOADING DEVICE

John W. Hice, Detroit, Mich., assignor, by mesne assignments, to The Worth Company, a corporation of Michigan Application November 11, 1931, Serial No. 574,384

12 Claims. (Cl. 105—368)

The invention relates to loading devices and it has particular relation to devices for loading motor vehicles in freight cars or the like for transportation purposes.

The principal objects of the invention are to provide improvements in loading motor vehicles in freight cars or the like, in which one motor vehicle may be mounted in decked relation to another, and in such manner that undesirable movement of the vehicles in the car is prevented and such vehicles may be transported without possibility of being damaged; to provide a car loading device for decking motor vehicles in a freight car or the like which may be manufactured very inexpensively and applied for the purposes specified without requiring much manual labor or manipulation and hence without much expense incidental to mounting the vehicles in the car; and in general to provide car loading devices which can be built inexpensively and applied quickly, and which will positively prevent movement of the vehicle in the freight car during transportation thereof.

For a better understanding of the invention reference may be had to the accompanying drawing forming a part of the specification wherein:

Fig. 1 is a fragmentary, cross sectional view of a freight car illustrating a car loading device which is constructed according to one form of the invention;

Fig. 2 is a view of one of the loading devices for one of the vehicle wheels, illustrating the device in greater detail for the purpose of clarity;

Fig. 3 is a lateral view on a larger scale, taken substantially along line 3—3 of Fig. 1;

Fig. 4 is a plan view of the construction shown by Fig. 3;

Fig. 5 is a cross-sectional view on a larger scale taken substantially along the line 5—5 of Fig. 3.

Referring to Fig. 1, a freight car is illustrated, and comprises a floor 10, side walls 11 and 12 and a roof, although in the drawing the roof has not been illustrated. In mounting a motor vehicle in a freight car according to the preferred form of the invention, the rear wheels of the vehicle are anchored directly to the floor while the front wheels are supported a considerable distance above the floor, this arrangement permitting moving a part of a second vehicle under the elevated part of the first vehicle. In the construction illustrated, the rear wheels indicated generally at 13 are anchored on the floor by means of chocks or loading blocks 14, one of which is located at the front and rear side of each wheel. It may be pointed out in this connection that in Fig. 1 the rear wheels 13 are in front of the front wheels, or in other words, as illustrated, the front wheels are above the plane of the sheet of drawings. The present invention relates particularly to the manner of supporting the other or front set of vehicle wheels in elevated position and the loading device provided for this purpose will now be described.

Referring to Figs. 3 and 4 particularly, each of the devices for supporting one of the elevated wheels in the freight car comprises a substantially rectangular frame 15 which preferably is constructed of wood, although other materials such as metal may be employed. The frame 15 includes side members 16 and 17 secured by nails or other suitable securing means indicated at 18 to a member 19 secured in turn by nails or other suitable securing means 21 to the side wall of the freight car. It will be noted in Fig. 3 particularly, that the side members 16 and 17 are disposed in different horizontal planes and that the member 19 is inclined accordingly between the ends of such side members it connects. The outer ends of the side members 16 and 17 are connected by a thinner strip of wood or other suitable material indicated at 22, nails or other suitable securing means 23 being used to secure the ends of the member 22 to the end faces of the side members. Adjacent the member 22 a thin, metal strap 24 extends between the side members 16 and 17, and such strap at its ends as shown best by Fig. 3, is bent over side members 16 and 17 and extends downwardly along the remotely disposed sides of such members. Bolts 29 and 30 extending through the side members 16 and 17 are employed for securing the bent over portions of the strap 24 to such members. Intermediate the side members, the strap 24 is bent downwardly into arcuate shape for the purpose of providing a support for the bottom portion of a tire mounted on one of the vehicle wheels.

For bracing the frame 15 against longitudinal movement, members 31 and 32 are provided, which respectively extend from points adjacent the outer ends of the side members 16 and 17, and in diverging relation to the side wall of the freight car. Each of the members 31 and 32 has an angular plate 34 secured to its end adjacent the outer end of the frame 15, by means of nails or other suitable securing means 35, and such securing means also may be employed for securing the member directly to the side member of the frame 15 with which it is associated. The angular plate 34 has a projecting portion 36 extending along the side of the frame side member beyond the outer end of the bracing member and such projecting portion of the plate is apertured and secured to the frame side member by one of the aforesaid bolts 29 and 30. The opposite end of each bracing member is provided with a similar plate 38 which has a projecting portion 39 secured by suitable fastening means 40 to the side wall of the car.

For supporting the outer end of the frame 15 against downward movement when a vehicle is supported thereby, tensile and sufficiently stiff wires 45 and 46 are utilized which are respectively looped about portions of the bolts 29 and 30 at the remote sides of the frame members 16 and 17. As clearly illustrated by the figures, the wires 45 and 46 extend upwardly and obliquely toward the side wall of the freight car, and cross each other substantially centrally of their ends, and for securing each of the wires 45 and 46 to the wall of the freight car, a metal plate indicated at 50 is employed and this plate is secured to the wall of the car by means of nails 51 or any other suitable securing means. Centrally of its side edges, the plate 50 is provided with a raised or outwardly pressed portion 52 to provide a recess indicated at 53 in Fig. 5, under the plate and extending throughout its length. Adjacent its upper end, the raised portion 52 of the plate is provided with a slot 54. The wire secured to the plate extends upwardly through the recess 53 as shown by Fig. 5, and then projects outwardly through the slot and then is reversely bent as indicated at 55 over the upper end portion of the raised portion 52, and then extends back into the recess to a point adjacent the slot. The wires being relatively stiff as mentioned previously, the weight of a vehicle on the frame work 15 positively cannot disconnect the wires from the bolts 29 and 30 or such wires from the plates 50 on the side wall of the car.

For bracing the vehicle against transverse movement, a bracing member 57 constructed of wood or other suitable material is nailed to the side wall of the car above the frame 15 and against the lower side of an anchoring bar 58 secured to such side wall, and extends downwardly to a point adjacent the strap 24. The lower and inner end of the member 57 is adapted to fit in the hub 59 of the vehicle wheel after the hub cap ordinarily provided, is removed. It is apparent that the members 57 at opposite sides of the car positively will prevent any transverse movement of the vehicle axle and hence the vehicle. Moreover these members will positively prevent any upward movement of the vehicle axle, for the reason that they are inclined upwardly and hence any tendency of the vehicle to move upwardly will be opposed by the engagement of the adjacent ends of the members with the wheel hubs.

It has been mentioned previously that the frame is disposed in a plane slightly inclined to the horizontal. In this connection, it is desired to call attention to the fact that the wires 45 and 46, and the bracing members 31, 32 and 57 are correspondingly displaced with respect to positions they would have if the frame were in a horizontal plane. This may be explained by stating that the wires and bracing devices are symmetrically located at opposite sides of a plane passing substantially centrally through the frame 15, at right angles thereto, and at right angles to the side wall of the car. Hence the device is peculiarly adapted to support the load of the front wheel when the vehicle is inclined as shown by Fig. 3, since the arc of movement of the wheel axle is substantially aligned with the plane previously mentioned.

Loading devices such as described can be manufactured inexpensively from wood or other suitable material and can readily and quickly be applied without involving much labor or expense incidental to its mounting. In mounting the vehicle wheels on the straps 24, the members 22 connecting the ends of the side members 16 and 17 of frame 15 may be omitted and then after the wheels are disposed on the strap, such members may be nailed to the frame members. However, it should be understood that such members may be secured to the frame before the wheels are associated with the strap although it is easier to associate the wheel with the strap before the member 22 is applied.

In mounting the vehicle, the front axle and wheels thereon are elevated and then the loading devices may be associated with the side wall of the freight car. The wires 45 and 46 may be permanently associated with the car and separated from the frame 15 by removing the nuts and bolts 29 and 30, and in this event it is only necessary to fasten the frame 15 and bracing members 31 and 32 to the side wall of the freight car and then associate the lower ends of the wires with the bolts 29 and 30.

The invention provides a simple and inexpensive loading device and this is of considerable importance because the expense incidental to loading and transporting vehicles in freight cars must be kept down to a minimum if loading devices are to be commercially practical.

Although only one form of the invention has been described and illustrated in detail it will be apparent to those skilled in the art that various modifications may be made without departing from the scope of the appended claims.

I claim:

1. In combination with a freight car, a vehicle in the car, means for anchoring one end of the vehicle, means for supporting the other end of the vehicle in elevated position with respect to the first end so that the vehicle is disposed in an inclined plane, said last means being connected to an upper part of the car and to the elevated end of the vehicle, and being generally directed in a plane inclined to the vertical and directed upwardly and toward the other end of the vehicle, so that the effective line of support from the elevated end of the vehicle, is upwardly and toward the other end of the vehicle.

2. In combination with a freight car, a vehicle in the car, means for anchoring one end of the vehicle, and means for suspending the other end of the vehicle in a position elevated with respect to the first end, said suspension means being connected to the elevated end of the vehicle and to an upper part of the car, and being generally directed at an angle to the vertical and upwardly and toward the other end of the vehicle, so that the effective line of suspension from the connection to the elevated end of the vehicle, is upwardly and toward the other end of the vehicle.

3. In combination with a freight car, a vehicle in the car, means for anchoring one end of the vehicle, and suspension means at each side of the car for engaging one side of the other end of the vehicle and maintaining it in a position elevated with respect to the first end, said suspension means being connected to upper parts of the car and extending downwardly and inwardly to the elevated end of the vehicle, said suspension means being generally directed from the elevated end of the vehicle, in a plane upwardly and toward the other end of the vehicle, so that the effective line of suspension at each side of the elevated end of the vehicle is from the connection to such elevated end, upwardly and toward the other end of the vehicle.

4. In combination with a freight car, a vehicle mounted in the car, means for anchoring one end of the vehicle, tire engaging devices for engaging the tires on the wheels at the other end of the vehicle, a suspension means connected to each tire engaging device and to an upper part of the car for holding such end of the vehicle in a position elevated with respect to its other end, each suspension means being directed from the tire engaging device, upwardly and toward the other end of the vehicle, so that the effective line of suspension is directed from tire engaging devices at an angle to the vertical and upwardly and toward the other end of the vehicle.

5. In combination with a freight car, a vehicle in the car, means for anchoring one end of the vehicle, tire engaging devices for the tires on the wheels at the other end of the vehicle, and a suspension means connected to each tire engaging device and extending upwardly and outwardly in converging relation to the adjacent side wall of the car, and connected to an upper part of the car for holding such end of the vehicle in a position elevated with respect to the other end, each suspension means being also directed generally upwardly and toward the other end of the vehicle, so that the effective line of suspension from the connection with the tire engaging devices is upwardly and toward the other end of the vehicle.

6. A car loading device for supporting a vehicle in an inclined plane in a vehicle conveyor, comprising a shoe for engaging the lower peripheral surface of a tire on the elevated end of the vehicle, said shoe being disposed in a plane substantially parallel to the plane occupied by the axles of said vehicle when the latter is in its inclined position, and having its greatest resistance to load stress in a direction substantially perpendicular to said plane occupied by the axles of said vehicle, and means for supporting said shoe comprising supporting elements substantially symmetrically located with respect to a plane projecting substantially through the center of said shoe and the centers of the two elevated wheels of said vehicle and having its greatest resistance to load stress in a direction lying substantially within the last mentioned plane.

7. A car loading device for supporting a vehicle in an inclined position in a vehicle conveyor, comprising means engaging a part of the elevated end of the vehicle, and means operatively engaging said conveyor for supporting the first mentioned means and being located substantially symmetrically with respect to a plane intersecting the centers of the two elevated wheels of the vehicle and substantially perpendicular to the plane occupied by the axles of said vehicle, and having its greatest resistance to load stress in a direction lying substantially within said first plane.

8. A car loading device for supporting a vehicle in an inclined position in a vehicle conveyor, comprising a shoe for engaging the lower peripheral surface of a tire on the elevated end of the vehicle and supporting the latter, said shoe being disposed in a plane substantially parallel to the plane occupied by the axles of said vehicle when the latter is in its inclined position, and means operatively engaging said conveyor for supporting said shoe, said means having its greatest resistance to load stress in a direction oblique to said plane of the axles and perpendicular to a line in said plane of the axles, which line is parallel to the longitudinal center line of the vehicle.

9. A car loading device for supporting a vehicle in an inclined position in a vehicle conveyor, comprising a device suspended from an upper part of said conveyor adjacent the elevated end of said vehicle for supporting the latter, said device being disposed in a plane obliquely intersecting the plane of the axles of the inclined vehicle at a line parallel to the longitudinal center of the vehicle and having its greatest resistance to load stress in a direction perpendicular to said line of intersection.

10. In combination, a vehicle conveyor, a vehicle in said conveyor, and means for supporting one end of said vehicle in an elevated position, said means comprising frames secured to the side walls of the conveyor adjacent the elevated wheels of said vehicle and projecting inwardly under said wheels, a tire shoe supported by each frame and engaging one of said wheels for supporting it, means for supporting the inner portion of each frame, and means for bracing each frame against movement longitudinally of said conveyor, said frames being disposed in a plane substantially parallel to the plane occupied by the axles of said vehicle when the latter is in its inclined position, and said means having its greatest resistance to load stress in a direction oblique to said plane of the vehicle axles, and perpendicular to a line lying within the last said plane which line is parallel to the longitudinal center line of the vehicle.

11. In combination, a vehicle conveyor, a vehicle in said conveyor, and means for supporting one end of said vehicle in an elevated position, said means comprising frames secured to the side walls of the conveyor adjacent the elevated wheels of said vehicle and projecting inwardly under said wheels, a tire shoe supported by each frame and engaging and supporting one of said wheels, means for supporting the inner portion of each frame relative to said conveyor, and means for bracing said frame against movement longitudinally of said conveyor, said frame supporting means having its greatest resistance to load stress in a direction which is oblique to the plane of the axles of the inclined vehicle and perpendicular to a line in said plane, which line is parallel to the longitudinal center line of the vehicle.

12. In combination, a vehicle conveyor, a vehicle in said conveyor, means for supporting one end of said vehicle in an elevated position, said means comprising a frame secured to the side wall of the conveyor adjacent the elevated wheels of said vehicle and projecting inwardly under said wheels, a tire shoe in said frame and secured to both sides thereof for supporting a wheel of said vehicle, means for supporting the inner portion of said frame relative to said conveyor, and means for bracing the same against movement longitudinally of said conveyor, said means having its greatest resistance to load stress in a direction oblique to the plane of the axles and perpendicular to a line within said plane of the vehicle axles, which line is parallel to the longitudinal center line of the vehicle.

JOHN W. HICE.